US012067827B2

(12) United States Patent
Hellenbrand

(10) Patent No.: US 12,067,827 B2
(45) **Date of Patent: *Aug. 20, 2024**

(54) DEVICE FOR PACKAGING MEDICATION PORTIONS

(71) Applicant: CareFusion Germany 326 GmbH, Kelberg (DE)

(72) Inventor: Christoph Hellenbrand, Kaifenheim (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 60 days.

This patent is subject to a terminal disclaimer.

(21) Appl. No.: 17/512,971

(22) Filed: Oct. 28, 2021

(65) Prior Publication Data

US 2022/0051508 A1 Feb. 17, 2022

Related U.S. Application Data

(63) Continuation of application No. 16/690,980, filed on Nov. 21, 2019, now Pat. No. 11,170,601, which is a (Continued)

(51) Int. Cl.
*G07F 17/00* (2006.01)
*G07F 11/44* (2006.01)
(Continued)

(52) U.S. Cl.
CPC .......... *G07F 17/0092* (2013.01); *G07F 11/44* (2013.01); *G07F 11/46* (2013.01); *B65B 65/06* (2013.01); *B65B 2210/06* (2013.01)

(58) Field of Classification Search
CPC ...... G07F 17/0092; G07F 11/44; G07F 11/46; B65B 65/06
See application file for complete search history.

(56) References Cited

U.S. PATENT DOCUMENTS 4,267,942 A * 5/1981 Wick, Jr. ............ G07F 17/0092 221/92
4,664,289 A * 5/1987 Shimizu .............. G07F 17/0092 439/43
(Continued)

FOREIGN PATENT DOCUMENTS

CN 101370547 A 2/2009
CN 102264336 A 11/2011
(Continued)

OTHER PUBLICATIONS

Extended European Search Report for Application No. 15167584.0, dated Dec. 12, 2015, 9 pages excluding translation.
(Continued)

*Primary Examiner* — Lucas E. A. Palmer
(74) *Attorney, Agent, or Firm* — Morgan, Lewis & Bockius LLP

(57) ABSTRACT

A medication packaging device includes a frame structure on which a guide unit is removably fastened, the guide unit having multiple receptacle openings and a dispensing opening. The device also includes multiple storage and dispensing stations, each having a storage housing and a dispensing station having a medication dispensing channel, as well as a holding unit having a plurality of mounts. For each mount, a medication slide and a storage and dispensing station are arranged such that the receptacle openings of the medication slides are associated with the medication dispensing channels of the dispensing stations and the dispensing openings of the medication slides are associated with the receptacle openings of the guide unit. The holding unit and the frame structure are fastened on or in the device to be movable relative to one another so that the guide unit is accessible from outside the device when in an access position.

20 Claims, 6 Drawing Sheets

Related U.S. Application Data continuation of application No. 14/710,793, filed on May 13, 2015, now Pat. No. 10,490,016.

(51) Int. Cl.
*G07F 11/46* (2006.01)
*B65B 65/06* (2006.01)

(56) References Cited

U.S. PATENT DOCUMENTS 5,348,061 A * 9/1994 Riley ........ B65B 5/103 221/133
5,709,063 A * 1/1998 Yuyama ........ B65B 5/103 53/154
5,852,911 A * 12/1998 Yuyama ........ G07F 11/62 53/238
6,012,602 A * 1/2000 Yuyama ........ A61J 7/0084 221/133
6,145,700 A * 11/2000 Takahashi ........ G07F 17/0092 221/133
6,202,385 B1 * 3/2001 Kim ........ B65B 9/08 53/154
6,349,848 B1 * 2/2002 Uema ........ G07F 11/44 221/124
6,772,907 B2 * 8/2004 Kim ........ B65B 5/103 53/154
6,898,919 B2 * 5/2005 Kim ........ G07F 11/44 221/124
7,040,070 B2 * 5/2006 Yuyama ........ B65B 5/103 53/154
7,317,966 B2 * 1/2008 Takeda ........ G07F 11/62 700/242
7,428,805 B2 * 9/2008 Kim ........ A61J 7/0084 53/284.7
7,428,806 B2 * 9/2008 Kim ........ G07F 17/0092 221/83
7,451,583 B2 * 11/2008 Kim ........ B65B 65/00 221/83
7,455,163 B2 11/2008 Yuyama
7,637,079 B2 * 12/2009 Klingel ........ B65B 57/06 53/381.1
7,861,492 B2 * 1/2011 Yuyama ........ G07F 17/0092 221/9
8,833,602 B1 * 9/2014 Balasubramanian ........ G07F 11/005 221/277
8,950,166 B2 * 2/2015 Feehan ........ G07F 11/165 53/154
9,790,017 B2 10/2017 Yuyama
2003/0057225 A1 * 3/2003 Kim ........ B65B 9/08 221/92
2004/0084512 A1 * 5/2004 Inamura ........ B65B 5/103 229/87.01
2004/0099683 A1 * 5/2004 Shows ........ G07F 5/26 221/263
2004/0112911 A1 * 6/2004 Kim ........ G07F 17/0092 221/92
2004/0134043 A1 * 7/2004 Uema ........ G07F 11/62 24/297
2004/0182878 A1 * 9/2004 Ho ........ G07F 11/62 221/124
2004/0226855 A1 * 11/2004 Kim ........ G07F 17/0092 206/570
2005/0145644 A1 * 7/2005 Mori ........ G07F 11/62 221/242
2005/0234591 A1 * 10/2005 Kim ........ G07F 11/44 700/231
2006/0201107 A1 * 9/2006 Kim ........ G07F 9/002 53/154
2007/0022713 A1 * 2/2007 Yuyama ........ B65B 35/04 193/32
2007/0150092 A1 * 6/2007 Ohmura ........ G07F 7/1025 700/231
2007/0277477 A1 * 12/2007 Kim ........ B65B 57/00 53/154
2008/0110131 A1 * 5/2008 Kim ........ G16H 20/13 53/154
2009/0108016 A1 * 4/2009 Brown ........ G07F 11/62 221/28
2009/0266029 A1 * 10/2009 Kim ........ G07F 17/0092 53/235
2010/0042255 A1 * 2/2010 Boutin ........ B65B 35/38 53/154
2011/0196538 A1 * 8/2011 Michael ........ A61B 50/18 700/275
2011/0303692 A1 * 12/2011 Kim ........ G07F 11/44 221/124
2012/0012606 A1 * 1/2012 Longley ........ G07F 11/58 198/804
2012/0324829 A1 * 12/2012 Omura ........ G07F 11/44 53/147
2013/0270291 A1 * 10/2013 Omura ........ A61J 7/0084 221/92
2013/0318931 A1 * 12/2013 Holmes ........ G07F 11/165 53/562
2013/0340390 A1 * 12/2013 Carson ........ G07F 17/0092 53/473
2014/0245697 A1 * 9/2014 Omura ........ G07F 17/0092 53/237
2014/0246451 A1 * 9/2014 Yuyama ........ G07F 11/44 221/13
2014/0250829 A1 * 9/2014 Terzini ........ G07F 11/26 53/131.2
2015/0014343 A1 * 1/2015 Koike ........ G07F 11/52 221/9
2015/0127145 A1 * 5/2015 Kim ........ G16H 40/67 700/235
2015/0197391 A1 * 7/2015 Yuyama ........ G07F 11/18 221/130
2015/0251789 A1 * 9/2015 Lokkers ........ B65B 37/005 414/807
2016/0132659 A1 * 5/2016 Vaz ........ G16H 20/13 700/242
2016/0253860 A1 * 9/2016 Wilson ........ G07F 11/06 221/258
2016/0304229 A1 * 10/2016 Hellenbrand ........ B65B 9/08

FOREIGN PATENT DOCUMENTS

| | | | |
|---|---|---|---|
| CN | 103987625 | A | 8/2014 |
| EP | 1612146 | | 1/2006 |
| EP | 1612146 | A1 | 1/2006 |
| EP | 2702979 | | 3/2014 |
| EP | 2765080 | | 8/2014 |
| KR | 200297047 | Y1 | 12/2002 |
| KR | 100590842 | B1 | 9/2006 |
| WO | WO-2013034504 | | 3/2013 |
| WO | WO 2014032995 | | 3/2014 |

OTHER PUBLICATIONS

Australian Office Action for Application No. 2016260676, dated Jul. 28, 2020, 4 pages.
Brazilian Office Action for Application No. BR112017023282-0, dated Jul. 6, 2020, 6 pages including machine translation.
Canadian Office Action for Application No. 2983554, dated May 17, 2022, 3 pages.
Chinese Office Action for Application No. 201680027590.4, dated Oct. 31, 2019, 10 pages including machine translation.
Indian Office Action for Application No. 201727035736, dated Jul. 15, 2020, 5 pages.
International Search Report and Written Opinion for Application No. PCT/EP2016/059930, dated Jun. 10, 2016, 20 pages including English translation.
Japanese Office Action for Application No. 2017-556829, dated Jan. 14, 2020, 16 pages including translation.

(56) References Cited

OTHER PUBLICATIONS

Korean Decision on Registration for Application No. 10-2017-7031414, dated Feb. 22, 2023, 4 pages including translation.
Korean Office Action for Application No. 10-2017-7031414, dated Dec. 2, 2022, 10 pages including translation.
United Arab Emirates Office Action prepared by KIPO for Application No. P6001433/2017, dated Mar. 11, 2021, 10 pages.

* cited by examiner

DEVICE FOR PACKAGING MEDICATION PORTIONS

CROSS-REFERENCE TO RELATED APPLICATION

This application is a continuation of U.S. application Ser. No. 16/690,980, entitled "DEVICE FOR PACKAGING MEDICATION PORTIONS," filed Nov. 21, 2019, which issued as U.S. Pat. No. 11,170,601 on Nov. 9, 2021, which is a continuation of U.S. application Ser. No. 14/710,793, entitled "DEVICE FOR PACKAGING MEDICATION PORTIONS," filed May 13, 2015, which issued as U.S. Pat. No. 10,490,016 on Nov. 26, 2019, which are herein incorporated by reference in their entirety.

BACKGROUND

The disclosed embodiments relate to a packaging device for medications and in particular a packaging device for use in an automatic blister packaging machine.

In many medical treatment settings, it is desirable to provide a packaging device for medications for which cleaning-related shutdown times are minimized. For example, a guide unit may be removably arranged or fastened on a frame structure so that the guide unit may be removed and replaced with a guide unit that is already cleaned.

SUMMARY

Some of the disclosed embodiments provide a device for dispensing medications, comprising: a holding unit having first and second opposing sides; a plurality of medication storage and dispensing stations removably fastened to the first side of the holding unit, each storage and dispensing station having a medication dispensing channel for dispensing individual medications; a frame structure disposed on the second side of the holding unit; and a guide unit removably fastened to the frame structure, the guide unit comprising a plurality of guide receptacle openings and a guide dispensing opening, wherein each medication dispensing channel is aligned with one of the guide receptacle openings via one of a plurality of slide openings disposed through the holding unit such that individual medications dispensed from the plurality of medication storage and dispensing stations are dispensed from the guide dispensing opening.

Some of the disclosed embodiments also provide a medication dispensing device, comprising: a frame structure; first and second holding units disposed on opposing sides of the frame structure; first and second guide units removably fastened to the frame structure and disposed back to back between inner sides of the first and second holding units, the first guide unit comprising a plurality of first guide receptacle openings and a first guide dispensing opening, and the second guide unit comprising a plurality of second guide receptacle openings and a second guide dispensing opening; and a plurality of first and second medication storage and dispensing stations removably fastened to an outer side of the first and second holding units, respectively, each of the first and second storage and dispensing stations having first and second medication dispensing channels, respectively, for dispensing individual medications, wherein each first medication dispensing channel is aligned with one of the first guide receptacle openings via one of a plurality of first slide openings disposed through the first holding unit such that individual medications dispensed from the plurality of first medication storage and dispensing stations are dispensed from the first guide dispensing opening, and wherein each second medication dispensing channel is aligned with one of the second guide receptacle openings via one of a plurality of second slide openings disposed through the second holding unit such that individual medications dispensed from the plurality of second medication storage and dispensing stations are dispensed from the second guide dispensing opening.

Some of the disclosed embodiments also provide a dispensing unit for a medication packaging device, comprising: a holding unit having first and second opposing sides; a plurality of medication storage and dispensing stations removably fastened to the first side of the holding unit, each storage and dispensing station having a medication dispensing channel for dispensing individual medications; a frame structure disposed on the second side of the holding unit; a guide unit removably fastened to the frame structure, the guide unit comprising a plurality of guide receptacle openings and a guide dispensing opening; and a mounting mechanism configured to provide movement of the frame structure and the holding unit relative to one another.

The foregoing and other features, aspects and advantages of the disclosed embodiments will become more apparent from the following detailed description and accompanying drawings.

DETAILED DESCRIPTION

Figure 2:
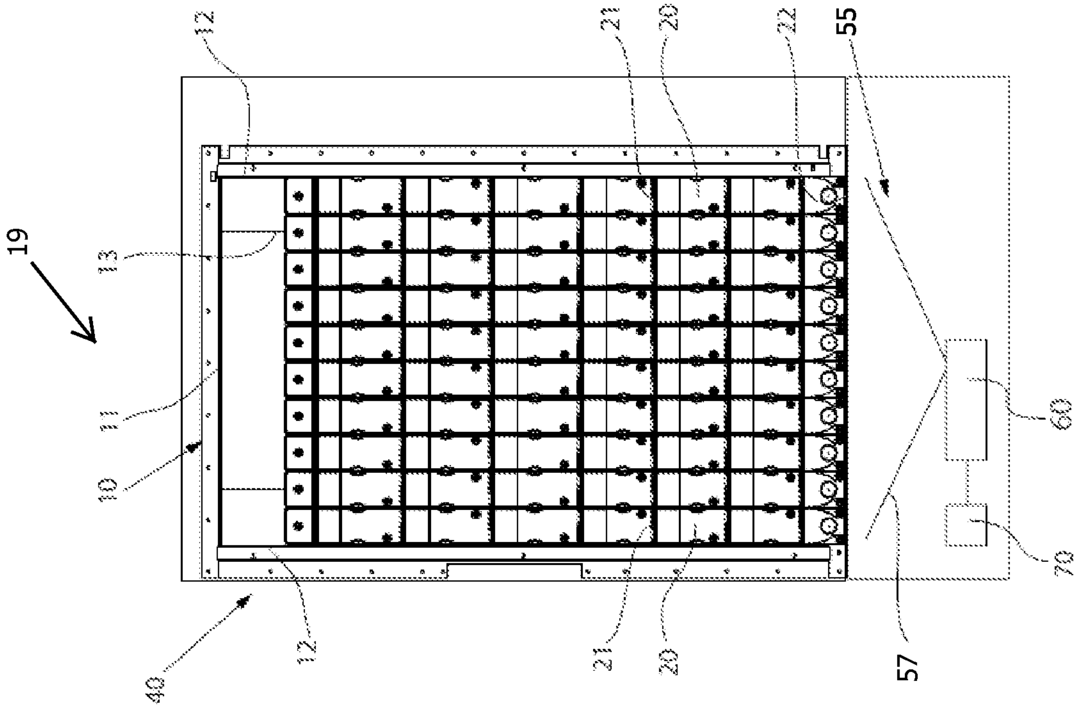
FIG. 2 is a front elevation view of an embodiment of a packaging device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Within the scope of this application, the term “individual” is regularly used, with this formulation intended to also include the plural. For example, in using the packaging device an individual medication portion or a plurality of medication portions may be simultaneously packaged.

Automatic blister packaging machines are usable in pharmacies and hospitals or, with appropriate dimensioning, also in blister packaging centers, and automatically combine medication combinations from multiple medication portions individually by patient according to the intake times ordered by the physician. The device packages medication combinations corresponding to order data in a pack formed from a packaging material web (e.g., blister packs), wherein the pack leaves the device for further use as a strand of blister packs (e.g., blister sleeve). A blister pack generally corresponds in this case to an intake time of a patient (e.g., it contains all medication portions that a patient must take at a predetermined time of day). The order data themselves may be data derived from prescriptions or the like, for example.

Some typical packaging devices are capable of creating a plurality (e.g., several hundred) of blister packs per hour and are therefore used in particular where corresponding blister packs are to be prepared for a plurality of patients. If the demand on the production speed of the blister packs is not as high, other simpler typical blister packaging machines are used, since the high volume device is relatively complex in order to achieve the high blister packaging speed. In the simpler blister packaging machines, a plurality of storage and dispensing stations is arranged in a matrix on or at a holding unit. From the storage and dispensing stations, the medication portions are supplied via a central guide unit to a packaging device, which blister packs the provided medication portions. Alternatively, the provided medication portions can also be packaged in another manner (e.g., pouches, bags, containers and the like).

The storage and dispensing stations are fastened “from the outside” on the holding unit, and the medication portions dispensed from the storage and dispensing stations reach the central guide unit via medication slides. Because of the plurality of different medications which can be stored in the storage and dispensing stations, the guide unit is typically contaminated with a plurality of different medication fragments. The medication fragments can be blister packaged or packed with the medication portions, and can trigger undesired side effects or allergic reactions when the patient takes the medication combination.

Thus, the parts of the packaging device that come into contact with various medication portions need to be regularly cleaned. In typical packaging devices, this cleaning operation is very time-consuming, since the devices must firstly be partially disassembled, to subsequently carefully clean the central guide unit by hand. It is desirable to provide a device for packaging medication portions in which cleaning-related shutdown times are reduced.

Accordingly, a packaging device is provided that includes a frame structure on which at least one guide unit is fastened, wherein the guide unit has a multiple receptacle openings and at least one dispensing opening. Here, the guide unit is an independent component, which may cooperate in the formation or support of a main structure of the device, but is not necessary for the main structure per se.

The packaging device may also include multiple storage and dispensing stations for dispensing individual medication portions. Each storage and dispensing station may have a storage housing for medication portions and a dispensing station having a medication dispensing channel for dispensing individual medication portions. The individual storage and dispensing stations are connected to a control unit, and individual medication portions may be dispensed from every storage and dispensing station upon a control command of this control unit.

The packaging device may further include a holding unit for the storage and dispensing stations, the holding unit having multiple mounts. In each mount, a medication slide having a receptacle opening and a dispensing opening and also a storage and dispensing station may be arranged. The arrangement is such that the receptacle openings of the medication slides are associated with the medication dispensing channels of the dispensing stations and the dispensing openings of the medication slides are associated with the receptacle openings of the at least one guide unit. In other words, the medication slides form the connecting element between the medication dispensing channel of a storage and dispensing station and the guide unit. For example, isolated medication portions may reach the guide unit via the medication slide.

In addition, to receive medication portions from the at least one guide unit and relay them to a packaging station, which packages the provided medication portions, the packaging device may include a collecting device. The manner of the embodiment of the collecting device is not significant here. Thus, for example, the collecting device may be a belt or a funnel arranged under the at least one guide unit, which conducts the dispensed medication portions to a filling and sealing device device.

Because of the plurality of the different medication portions which are dispensed from the storage and dispensing stations into the at least one guide unit, the packaging device tends to become rapidly contaminated with medication fragments. The higher the degree of contamination with medication fractions, the greater the risk that medication fragments will be packaged with the combined medication portions. Regular cleaning of the guide unit is therefore necessary.

To simplify such cleaning and therefore reduce the shutdown times of the device, the guide unit may be removably arranged or fastened on the frame structure. Also, the at least one holding unit and the frame structure may be fastened on or in the device such that the holding unit and the frame structure are movable relative to one another. Thus, the at least one guide unit may be accessed from outside the device in an access position, for example.

Because of the removable arrangement of the at least one guide unit on the frame structure, the guide unit may be removed and subsequently a guide unit which is already cleaned may be arranged in or on the frame structure. The combination of the above-mentioned features enables the cleaning of the device to be carried out substantially more rapidly. All storage and dispensing stations located on the holding unit may be moved away from the at least one guide unit by a single movement, and this guide unit may be removed and replaced by a clean guide unit. Thus, cumbersome cleaning of a permanently installed guide unit is dispensed with.

Depending on the type of the medication combinations to be expected and the number of medication portions to be packaged, a single guide unit or multiple guide units may be used in the packaging device. For example, if it is to be expected that only a relatively small number of medication combinations are to be packaged, one guide unit having one internal guide channel may be used. Here, medication portions enter the guide channel via the receptacle openings and exit again via the dispensing opening.

Alternatively, a guide unit having a plurality of guide channels may be used. Here, each guide channel may be associated with multiple receptacle openings and one dispensing opening. It is also conceivable to use multiple guide units having one or multiple guide channels.

The holding unit for the storage and dispensing stations is preferably fastened by a mounting mechanism to be pivotable on the frame structure. In such a case, the complete holding unit together with the storage and dispensing stations fastened thereon may be pivoted away from the guide units or units, so that a direct access to the guide unit or units is possible. The packaging device thus has a simple design and is cost-effective to implement.

Alternatively to the pivoting of the at least one holding unit on the frame structure, for example, it is contemplated to displace the at least one holding unit and the guide units in parallel to one another (e.g., the frame structure relative to a fixed holding unit or a holding unit relative to a fixed frame structure). For this purpose, a mounting mechanism (e.g., displacement mechanism) may be installed in the packaging device.

As already indicated, the guide units may be removably arranged or fastened on the frame structure. To enable the most rapid possible removal from the frame structure, it is provided in a preferred embodiment that the at least one guide unit is configured such that a formfitting removable connection exists between the guide unit and the frame structure. This has the advantage that a special tool is not required to remove the guide unit from the frame structure. Accordingly, the guide unit, or a composite of multiple guide units, may be suspended, for example, on a special mount of the frame structure. Further fixing of the guide unit is not absolutely necessary, since the guide unit is fixed during the "closing" of the device by the holding unit itself or the holding units themselves.

In addition to the guide units, the medication slides are components which are typically strongly contaminated with medication fragments, so that frequent cleaning of the medication slides is also necessary, particularly if a storage and dispensing station having a medication which deviates from the medication previously stored therein is used with a medication slide. Medication slides are typically an integral part of the holding unit, the storage and dispensing stations, or the guide unit. This has the result that the above-mentioned components have a complicated structure, which is therefore complex to clean. Accordingly, the medication slides may be removably fastened on the mounts of the at least one holding unit, so that they may be easily removed for cleaning and/or replaced by cleaned medication slides. For the above-mentioned reasons, it is particularly preferable for the medication slides to be configured such that a formfitting removable connection exists between the medication slides and a holding unit.

The collecting device may be implemented as a conveyor belt, for example, which transports dispensed medication portions to the filling and sealing device device. With corresponding implementation of the conveyor belt, for example, having separators arranged on the conveyor belt, multiple medication compositions may also be transported simultaneously using the conveyor belt. However, in regard to the reliability of the separation of the individual medication combinations, it is impractical to provide the conveyor belt with a plurality of separating means.

In a preferred embodiment of the packaging device, it is therefore provided that the collecting device includes multiple collecting units, which are used as temporary medication stores. One collecting unit is generally associated with one guide unit in this case, so that multiple medication preparations may be prepared in parallel. The medication preparation may then be transferred after completion, for example, by opening a closure flap of a collecting unit, to a funnel or the like, from which medication preparations reach the filling and sealing device.

Alternatively, the collecting units may also be fastened on a revolving transport belt that may be guided past below the guide units, so that each collecting unit can be guided past each guide unit (and therefore at each storage and dispensing station). This substantially increases the number of different medication portions which can be used for a medication combination. As soon as a collecting unit is guided past or over the filling and sealing device by the transport belt, the medication portions which are temporarily stored in the collecting unit may be transferred to the filling and sealing device.

To prevent medication fragments from hanging on the medication slides or the guide units and being absorbed or entrained by following medication portions, it is provided in a preferred embodiment that the medication slides and/or the guide unit has an antistick coating on the interior. Thus, adhesion of medication fragments which form during operation may be prevented. For example, the medication fragments fall downward through the packaging device and can be disposed of in special regions provided for this purpose.

During the cleaning of the packaging device, generally all medication slides are removed and replaced by cleaned medication slides. The number of these medication slides is substantial, so that during the replacement of contaminated medication slides one or more mounts may not be provided with a cleaned medication slide. As a result, the medication portions at these positions do not reach the associated guide unit as desired after dispensing by the dispensing station, which in turn has the undesired result that the medication portion does not reach the medication combination as provided. To prevent replacement of a medication slide from being overlooked during the cleaning of the device, it is provided in a preferred embodiment that the device may have a plurality of sensor units that detect the presence of all medication slides. If it is established that one or more medication slides are missing after closing of the device, a notification (e.g., a signal tone or a message on a display unit) may be output to request the insertion of the missing medication slides.

Figure 1:
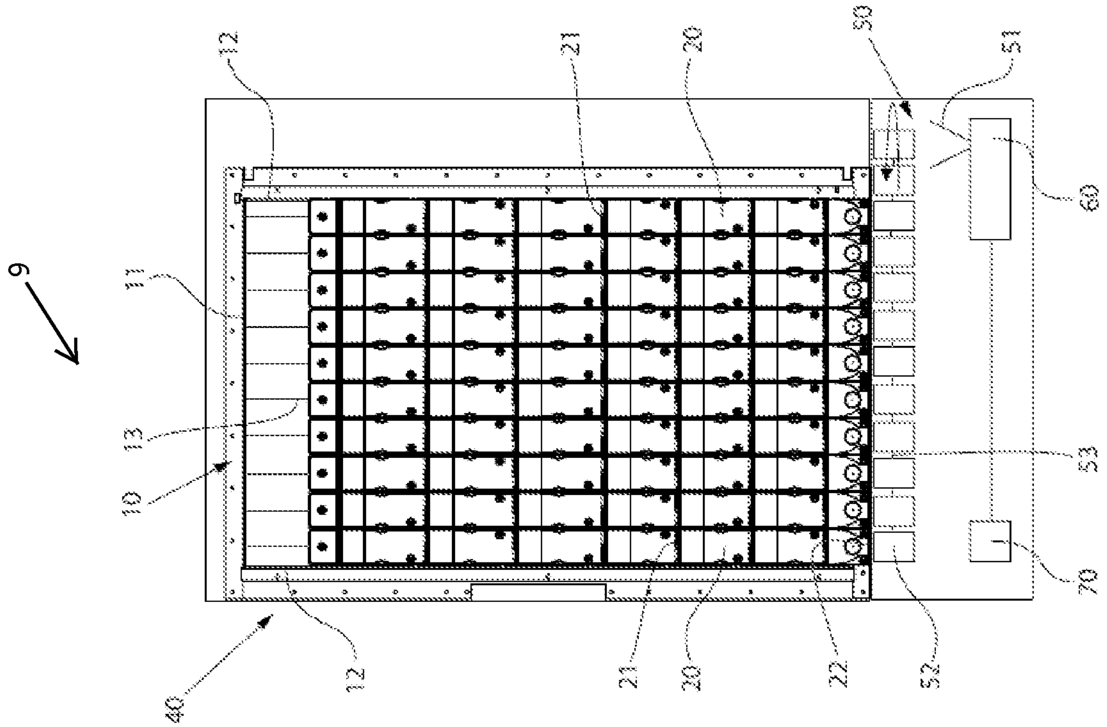
FIG. 1 is a front elevation view of an embodiment of a packaging device.

FIG. 1 shows embodiments of a device 9 for packaging medication portions. Multiple guide units 20 may be configured as oblong downpipes, each having multiple receptacle openings 21 (e.g., guide receptacle openings) and a dispensing opening 22 (e.g., guide dispensing opening). Multiple guide units 20 may be arranged in parallel adjacent to one another to form a bundle of guide units 20, wherein the guide units 20 may be connected to one another. Two such bundles may be arranged in parallel one behind another (see FIG. 3*a*). The individual guide units 20 may each be suspended on a suspension member 13 of a frame structure 10, so that a formfitting connection is formed between the guide units 20 and the suspension members 13. Each guide unit 20 may include a guide channel 23 (see FIG. 4*b*), to which medication portions may be supplied via the receptacle openings 21.

The frame structure 10 may include at least one horizontal girder 11 and at least two vertical girders 12 at the edges of the bundle of guide units 20, wherein the suspension members 13 may be fastened on the horizontal girder 11. The frame structure 10 may form a structure arranged inside the device 9, on which the guide units 20 are removably fastened. The guide units 20 themselves may be configured to not form a part of the internal support structure of the device 9 and to be removed completely from the device 9 without impairing the internal support structure.

The device 9 may also include a holding unit 40, which can be seen in the background in the illustration according to FIG. 1, and which is described in greater detail with reference to the following figures. The holding unit 40 may be used to hold multiple medication slides 42 (see FIG. 4*a*) and dispensing stations 32 (see FIG. 3*c*), and to align them in relation to the guide units 20.

A collecting device 50 may be arranged below the guide units 20. The collecting device may include multiple collecting units 52, which may be fastened on a revolving transport belt 53 and may be moved below the guide units 20. Each collecting unit 52 may thus be aligned for a certain period of time at each guide unit 20, so that medication portions may be transferred from each guide unit 20 into a specific collecting unit 52. The collecting device 50 may also include a funnel 51, into which the collected medication portions may be transferred from the collecting units 52 (e.g., by opening a closing flap (not shown) at a specific position above the funnel 51). From the funnel 51, the medication combinations formed by the medication portions reach a filling and sealing device 60 (only schematically shown), by which the medication combinations are packaged by filling and sealing the individual package. For example, each medication combination may be separately blister packaged or packed in another manner, such as with pouches, containers, bags and the like.

The filling and sealing device 60, the collecting device 50, and the storage and dispensing stations 30 (see FIG. 7) may be coupled to a control unit 70, via which the individual components of the device 9 may be activated.

FIG. 2 shows an embodiment of a device 19, wherein the device 19 corresponds in large part to the device 9 and only those aspects which deviate from the first embodiment are described hereafter.

As can be seen in the upper part of FIG. 2, the guide units 20 may only be fastened via two suspension members 13 inside the device. For example, the bundles of guide units 20 may each be assembled into one or two packets. The packets of guide units 20 may only be removed as a whole, which is advantageous with regard to the duration of the replacement of the guide units 20, but also requires that multiple guide units 20 be replaced at one time.

A collecting device 55 may be arranged under the guide units 20. The collecting device 55 may be configured as one large collecting funnel 57, which may supply the medication combinations to a filling and sealing device device 60, which may be coupled to a control unit 70. Here, the storage and dispensing stations 30 may also be coupled to the control unit 70, so that the storage and dispensing stations 30 may each be activated individually to dispense medication portions.

Features of device 9 may be combined with features of device 19. For example, the collecting device 50 having multiple collecting units 52 of device 9 may be combined with the configuration of the guide units 20 of device 19.

Figure 3C:
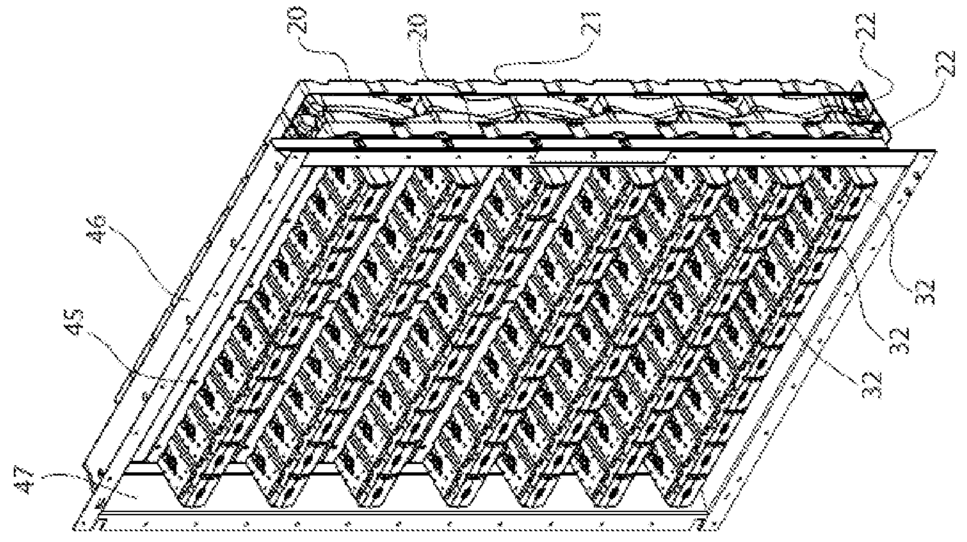
FIG. 3*c* is a perspective view of the packaging device of FIG. 2.
Figure 3B:
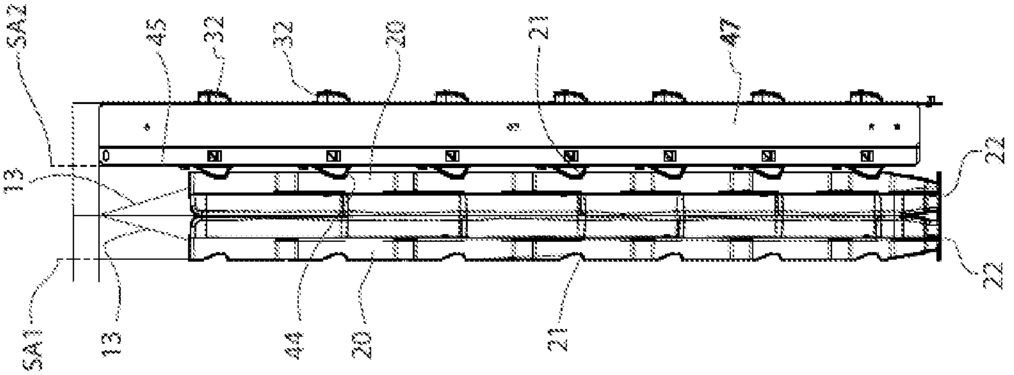
FIG. 3*b* is a side view of the packaging device of FIG. 2.
Figure 3A:
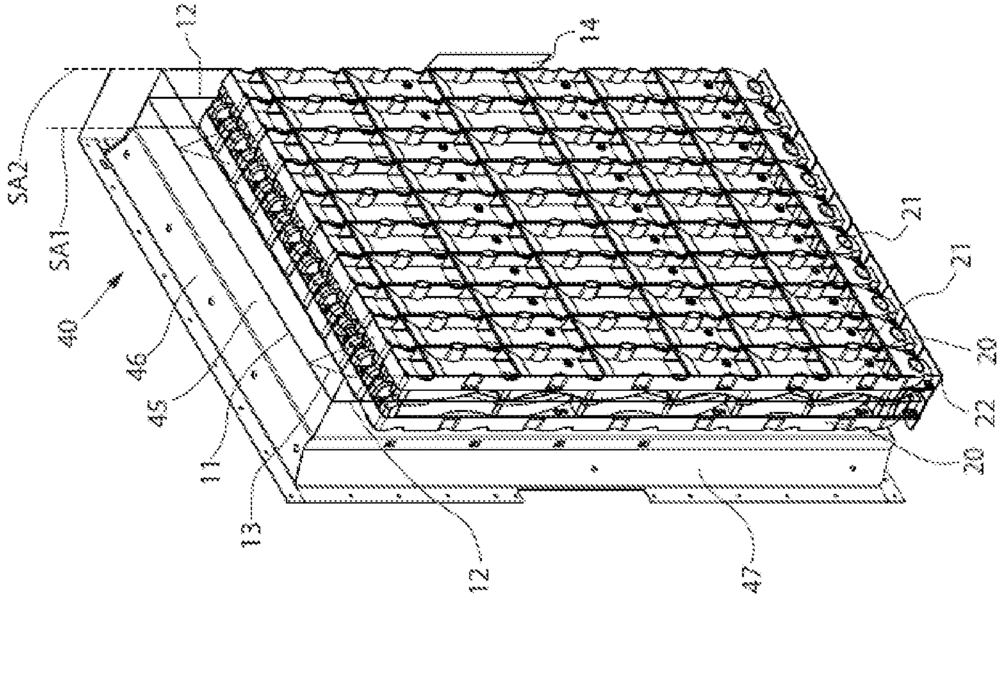
FIG. 3*a* is a perspective view of the packaging device of FIG. 2.

As shown in both FIGS. 3*a* and 3*b*, a dispensing unit of the device 9, 19 may include two bundles of guide units 20 arranged behind one another in parallel, wherein the guide units 20 or the bundles are arranged such that the receptacle openings 21 of the guide units 20 are arranged opposing and leading away from a middle plane between the bundles. A corresponding arrangement of the guide units 20 may be configured when, as will be shown in greater detail with regard to FIGS. 4*a* and 4*b*, two holding units 40 each having a plurality of storage and dispensing stations 30 are installed, of which only the dispensing stations 32 are indicated for the sake of clarity.

At least one holding unit 40 and the frame structure 10 may be fastened on or in the device 9, 19 such that the holding unit 40 and the frame structure 10 are movable in relation to one another. Thus, the guide units 20 may be accessed from the outside in an access position. In device 19, such a relative movement of the frame structure 10 and the holding unit 40 in relation to one another is implemented in that the holding unit 40 is configured to be pivotable.

As can be inferred from FIG. 3*a* in particular, the holding unit 40 may be configured as a type of door that includes a vertical holding plane 45 and essentially horizontal and vertical frame elements 46 and 47 respectively. Here, the frame elements 46 and 47, as will be described hereafter with reference to FIG. 3*c*, form a type of protective frame for the plurality of storage and dispensing stations 30.

As already indicated, the arrangement of the guide units 20 may include two holding units 40, which are pivotable with respect to the guide units 20, and specifically about the pivot axes SA1 and SA2. To implement such a pivot, corresponding mounting mechanisms (e.g., pivot joints) are arranged either on the rear vertical girder 12, or other additional components of the frame structure 10 or the device 9, 19. In FIG. 3*a*, a corresponding pivot joint 14 is indicated for the second holding unit 40 (not shown).

As shown in FIG. 3*b*, two bundles of guide units may lie back to back and the respective receptacle openings 21 may be arranged opposing one another. The guide units 20 thus have multiple receptacle openings 21 facing outward or away from the center plane of the device 9, 19.

In FIG. 3*b*, a holding unit 40 is only shown on the right side. The holding unit 40, as described in greater detail with reference to FIG. 3*c*, includes a plurality of storage and dispensing stations 30, of which only the dispensing stations 32 are indicated for the sake of clarity.

Each dispensing station 32 is associated with a medication slide 42 (see FIG. 5*c*), which extends through the holding plane 45 and provides a connection between a medication dispensing channel 33 (see FIG. 5*c*) of the dispensing station 32 and the receptacle openings 21 of the guide units 20. The dispensing stations 32 themselves thus may not extend with a portion through the holding plane 45, but rather may be arranged or fastened thereon from the outside.

FIG. 3*c* illustrates how the dispensing stations 32 of the storage and dispensing stations 30 may be arranged on or at the holding unit 40. The storage and dispensing stations 30 may be arranged in a matrix, which is enclosed and protected by the horizontal and vertical frame elements 46, 47 of the holding unit 40. The dispensing stations 32 may be removably fastened on the holding plane 45 of the holding unit 40 and the storage housings 31 may be removably placed on the dispensing stations 32.

Figure 4B:
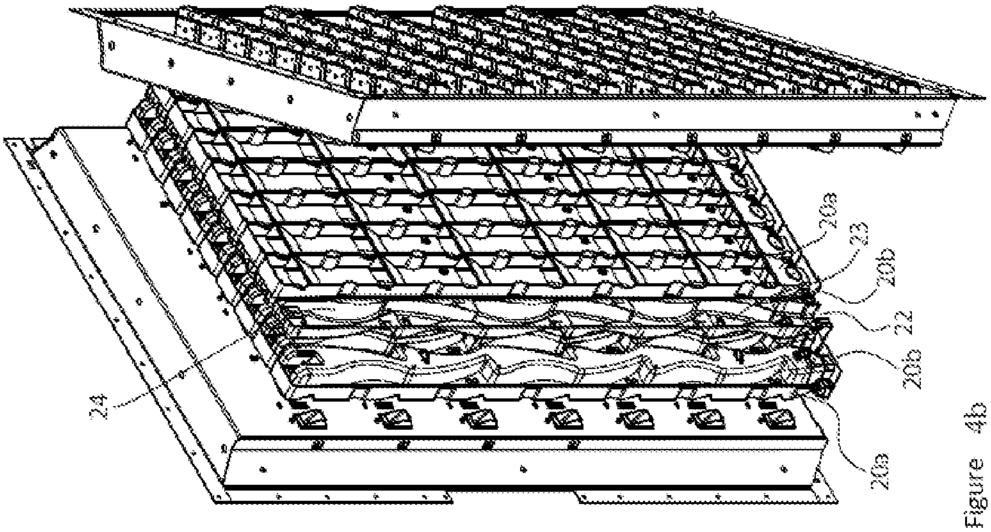
FIG. 4*b* is a perspective partially cut-away view of the packaging device of FIG. 4*a;*
Figure 4A:
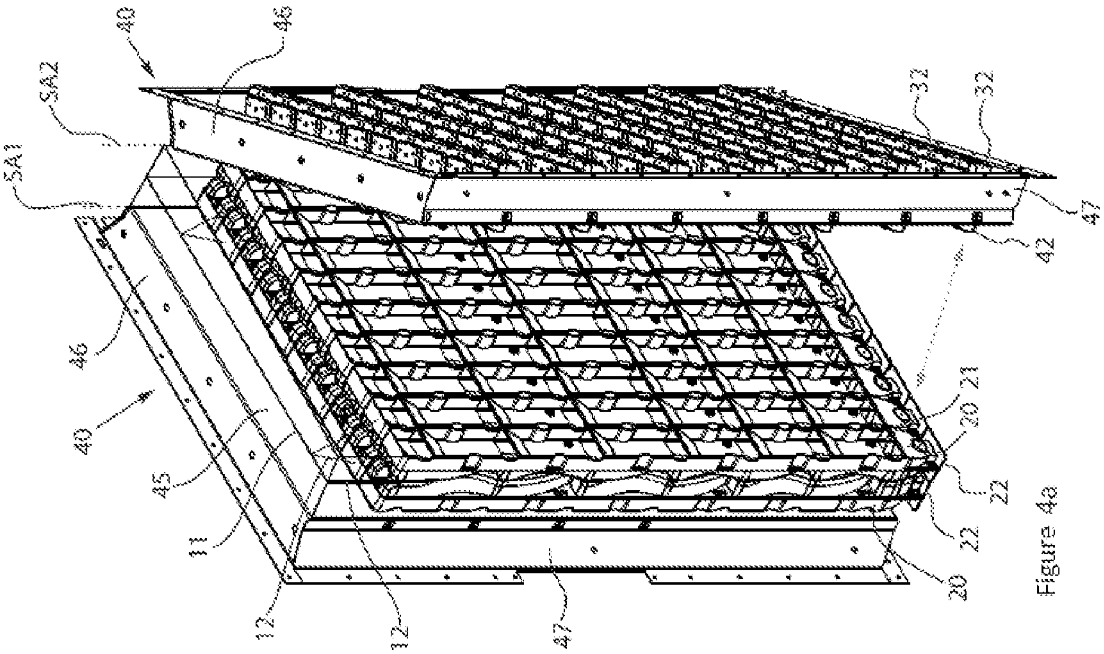
FIG. 4*a* is a perspective view of the packaging device of FIG. 2.

FIGS. 4*a* and 4*b* show detail views of portions of device 19, wherein two holding units 40 are illustrated as being arranged so the holding units 40 are pivotable inside the device 19. As indicated in FIGS. 3*a*, 3*b*, the holding units 40 may be mounted in the device 19 using pivot joints 14.

In the figures, the rear or left holding unit 40 is shown in a closed state (e.g., in a state in which the storage and dispensing stations 30 and the medication slides 42 are aligned on the guide units 20). The front or right holding unit 40 is shown already pivoted away somewhat from the guide units 20, specifically on the pivot axis SA2. All guide units 20 inside the device 19 and the medication slides 42 of the holding unit 20 may be accessed by pivoting open or away the complete holding unit 40. The position shown in FIGS. 4*a* and 4*b*, however, is not shown to be suitable for unobstructed access to the above-mentioned components. For unobstructed access, the holding unit 40 must be pivoted away still further from the guide units 20.

As shown in FIG. 4*b*, the guide units 20 may be implemented in multiple parts (e.g., two halves), wherein one half 20*a* facing toward a holding unit 40 has the receptacle openings 21 in the embodiment shown. A half 20*b* facing toward the middle of the device 19 may include a guide channel 23, wherein the guide channel 23 may have internal projections to slow the falling speed of medication portions inside the guide unit 20. As further shown in FIG. 4*b*, the guide units 20 may be provided on the inside with an anti-stick coating 24 to prevent adhesion of broken-off medication fragments.

Each guide unit 20 may include a guide channel 23. As already indicated, the guide units 20 may also be configured differently in alternative embodiments. Thus, for example, a guide unit 20 having multiple guide channels 23 or two guide units 20 each having multiple guide channels 23 may be used. In the simplest case, only one guide unit 20 having at least one guide channel 23 may be used. Here, the respective distribution/arrangement of the receptacle openings 21 and the dispensing openings 22 is dependent on the precise number and design of the guide channels 23.

Figure 5A:
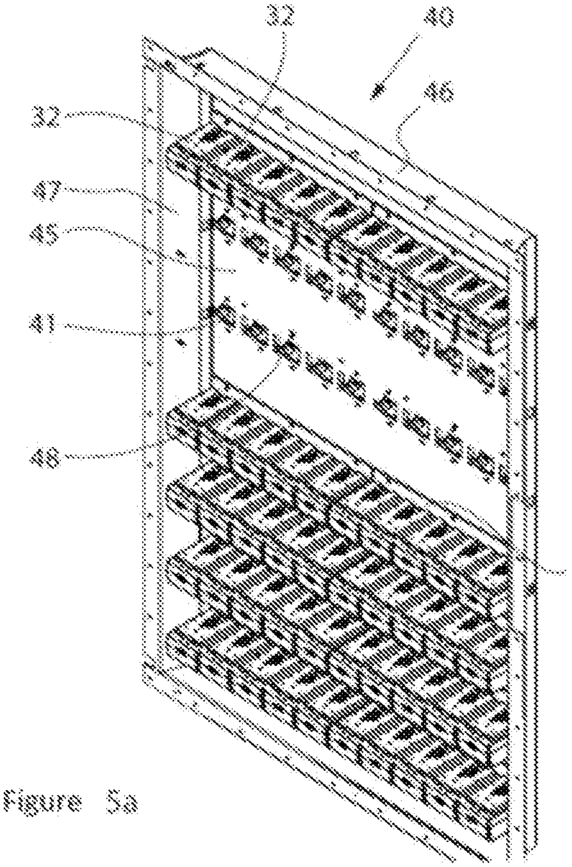
FIG. 5*a* is a front perspective view of an embodiment of a holding unit.
Figure 5B:
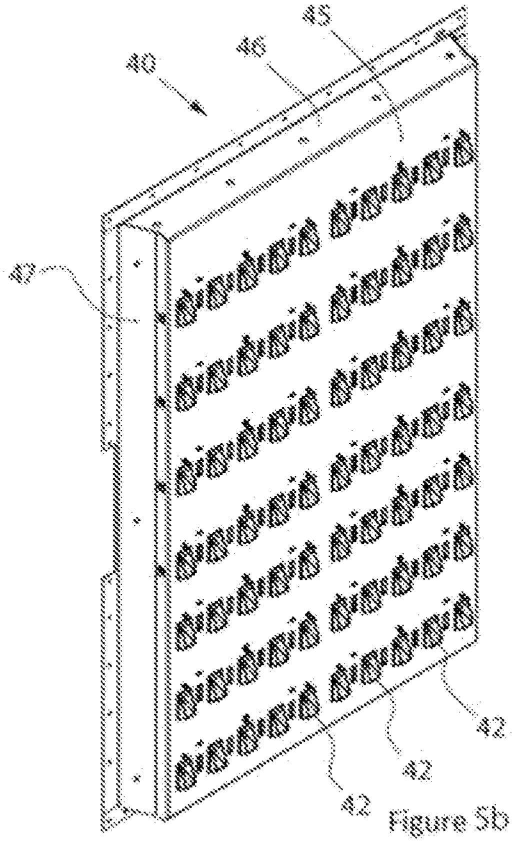
FIG. 5*b* is a rear perspective view of the holding unit of FIG. 5*a;*
Figure 5C:
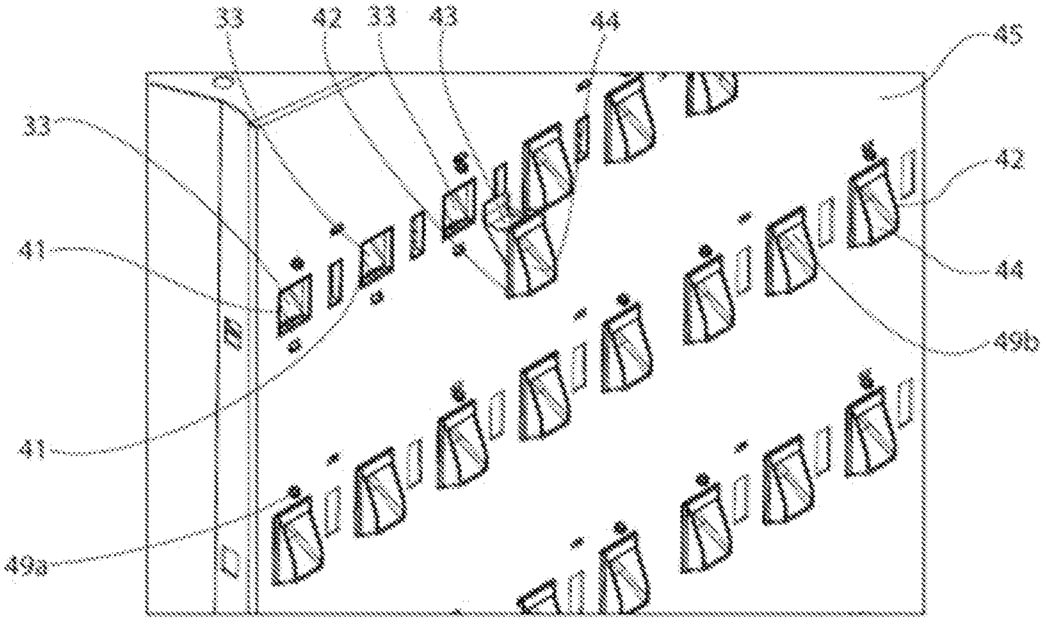
FIG. 5*c* is a rear perspective partial view of the holding unit of FIG. 5*a;*

FIGS. 5*a* to 5*c* show a holding unit 40 having multiple dispensing stations 32 fastened thereon, each dispensing station 32 being a part of a storage and dispensing station 30. In the view according to FIG. 5*a*, the storage housings 31, and two rows of dispensing stations 32 and medication slides 42 associated therewith are omitted and it can be seen that the holding plane 45 of the holding unit 40 has multiple mounts 41. The mounts 41 may be configured as openings in the holding plane 45, and the medication slides 42 may be arranged in a formfitting and removable manner in these openings (see FIGS. 5*b*, 5*c*). Projections 48 may be disposed on each of the mounts 41, to which the dispensing stations 32 of the storage and dispensing stations 30 may be fastened. For example, a projection 48 may be a portion of a medication slide 42.

As shown in FIGS. 5*b* and 5*c*, a medication slide 42 may be arranged in each mount 41, via which the medication portions may be conducted from the medication dispensing channels 33 of the dispensing stations 32 into the guide units 20.

As already described, it is preferable for the medication slides 42 to be arranged in a formfitting manner on the mounts 41. As shown in FIG. 5*c*, the medication slides 42 may be inserted into the mounts 41, wherein receptacle openings 43 (e.g., slide receptacle openings) press against the medication dispensing channels 33 of the dispensing stations 32. Dispensing openings 44 (e.g., slide dispensing openings) of the medication slides 42 are aligned on the receptacle openings 21 of the guide units 20 in the closed state of the device. For example, the projection 48 and the slide receptacle opening 43 of the medication slide 42 may be disposed on one side of the holding plane 45 to engage with a dispensing station 32, while a slide dispensing opening 44 may be disposed on the other side of the holding plane 45 to engage with a guide unit 20.

As shown in FIG. 5*c*, the medication slides 42 may have an anti-stick coating 49*b*, which prevents or makes more difficult the adhesion of medication fragments. Further, the holding unit 40 may include multiple sensors 49*a*, which detect a presence of the medication slides 42. The arrangement and number of the sensors 49*a* is dependent on the precise structure thereof. The sensors 49*a* may be connected to the control unit 70 of the device 9, 19, and an absence of a medication slide 42 may be centrally displayed. In addition, the sensors 49*a* may be configured to ascertain the degree of soiling of the medication slides 42 and transmit such information to the control unit 70.

Figure 6B:
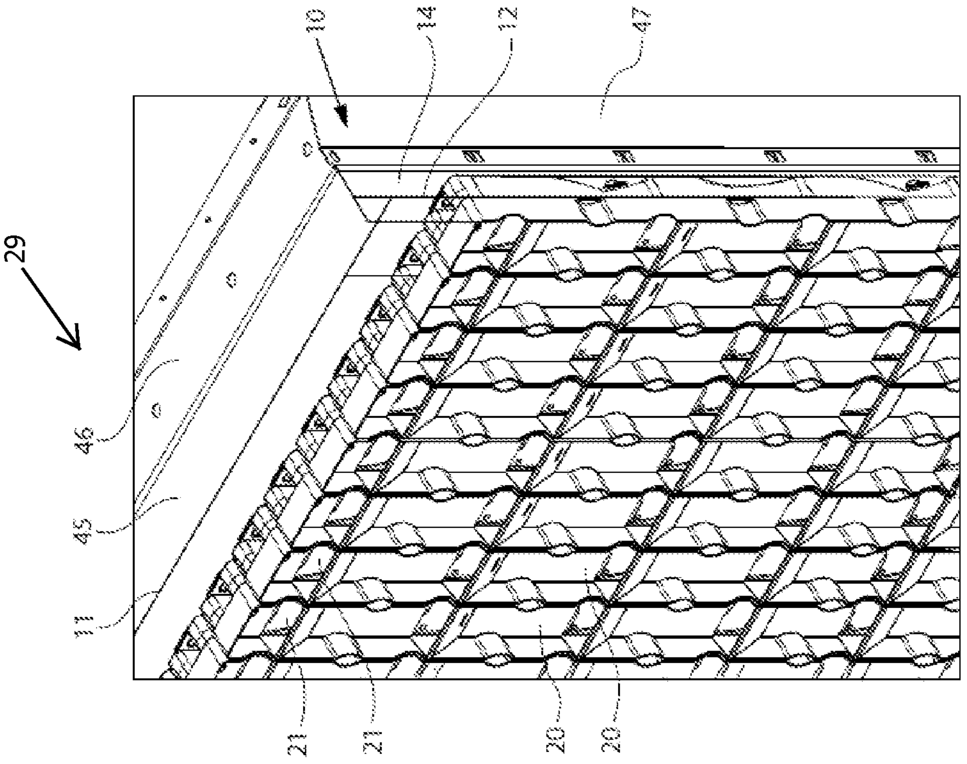
FIG. 6*b* is a perspective partial view of the packaging device of FIG. 6*a*.
Figure 6A:
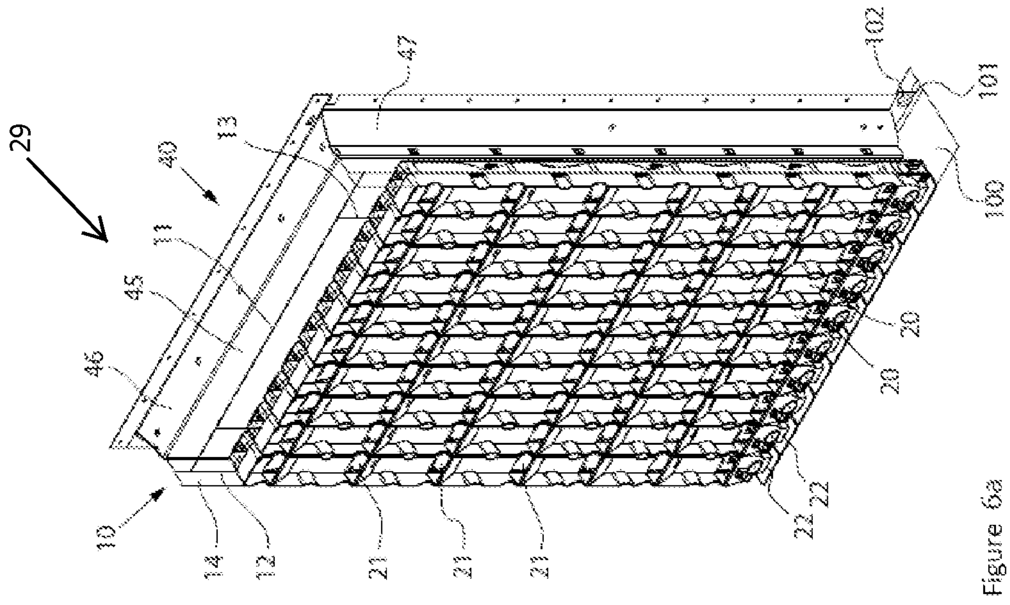
FIG. 6*a* is a perspective view of a portion of an embodiment of a packaging device.

FIGS. 6*a* and 6*b* show detail views of a device 29 having a single layer of guide units 20 arranged in parallel, and having receptacle openings 21 on both sides of the guide unit 20. Only the receptacle openings 21 that are not concealed by a holding unit 40 are shown in FIGS. 6*a* and 6*b*. Thus, in device 29, medication portions may be dispensed into the guide units 20 from the storage and dispensing stations 30 on both sides of the guide units 20 (e.g., first and second sides of the guide unit 20).

In device 9 and device 19, the holding units 20 are pivotably mounted. In device 29, a sliding mechanism may be configured at the lower end of the holding unit 40. A guide rail 101 may be arranged on a floor plate 100 of the device 29, in which rollers 102 are guided at the lower end of the holding unit 40. Comparable to a sliding door, the holding unit 40 with all storage and dispensing stations 30 and medication slides 42 may be pushed away from the guide units 20, providing access to the guide units 20 and the medication slides 42. Alternatively, the frame structure 10 may be mounted to be displaceable inside the device 29, so that the guide units 20 may be pulled out of the composite holding unit 40/guide units 20/holding unit 40.

The features described in reference to device 29 may be combined with other features described with regard to device 9 and device 19.

Figure 7:
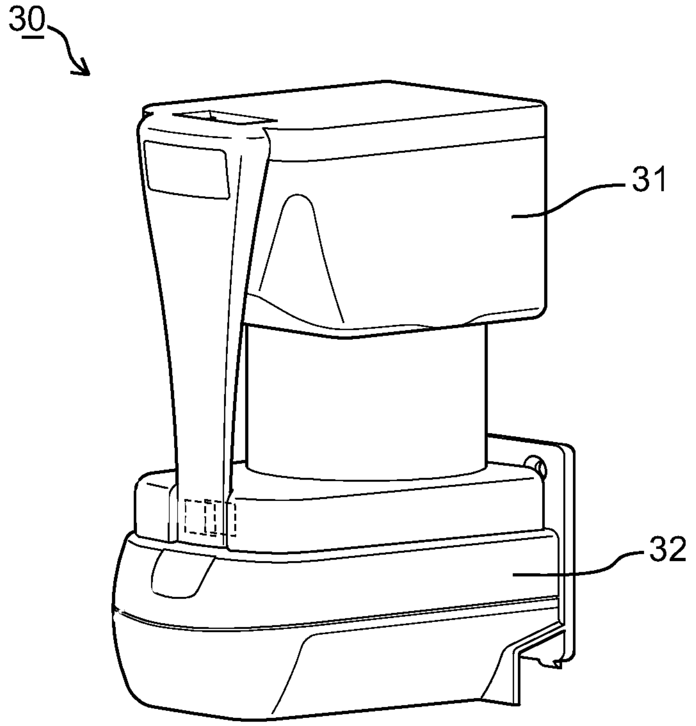
FIG. 7 is a perspective view of an embodiment of a storage and dispensing station.

As shown in FIG. 7, an example embodiment of a storage and dispensing station 30 includes a storage housing 31 for storing medications (e.g., pills, tablets) and a dispensing station 32 for dispensing the stored medications from the storage housing 31.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A device for dispensing medications, comprising:

a holding unit having first and second opposing sides;

a plurality of medication storage and dispensing stations removably fastened to the first side of the holding unit, each storage and dispensing station having a medication dispensing channel for dispensing individual medications;

a plurality of medication slides fastened to the second side of the holding unit;

a frame structure disposed on the second side of the holding unit; and a plurality of guide units removably fastened to the frame structure and disposed on the second side of the holding unit, each guide unit comprising a plurality of guide receptacle openings and a guide dispensing opening, wherein each medication dispensing channel is aligned with one of the guide receptacle openings via one of a plurality of slide openings disposed through the holding unit such that individual medications dispensed from the plurality of medication storage and dispensing stations are dispensed from the guide dispensing opening.

2. The device of claim 1, wherein the holding unit is mounted in the device by a pivot joint and configured to be pivotable.

3. The device of claim 1, wherein the holding unit is slidably mounted in the device with a sliding mechanism.

4. The device of claim 1, wherein the guide unit is configured so that a formfitting removable connection exists between the guide unit and a suspension member of the frame structure.

5. The device of claim 1, further comprising a wherein the plurality of medication slides are removably fastened to the holding unit, each medication slide aligned with one of the plurality of slide openings.

6. The device of claim 1, wherein each medication slide is configured so that a formfitting connection exists between the medication slide and the holding unit.

7. The device of claim 1, wherein a portion of each medication slide is received within one of the plurality of guide receptacle openings.

8. The device of claim 1, further comprising a sensor unit configured to detect a presence of one or more of the medication slides.

9. The device of claim 1, further comprising a sensor unit configured to detect a degree of soiling of one or more of the medication slides.

10. The device of claim 1, further comprising a collecting device for receiving individual medications from the guide dispensing opening of the guide unit.

11. The device of claim 10, wherein the collecting device comprises a plurality of collecting units configured to be used as temporary medication stores.

12. The device of claim 1, wherein the guide unit has an anti-stick coating on the inside.

13. The device of claim 1, wherein the guide unit comprises a first half having the guide receptacle openings and a second half having a guide channel.

14. A medication dispensing device, comprising:

a frame structure;

first and second holding units disposed on opposing sides of the frame structure;

first and second guide units removably fastened to the frame structure and disposed back to back between inner sides of the first and second holding units, the first guide unit comprising a plurality of first guide receptacle openings and a first guide dispensing opening, and the second guide unit comprising a plurality of second guide receptacle openings and a second guide dispensing opening; and a plurality of first and second medication storage and dispensing stations removably fastened to an outer side of the first and second holding units, respectively, each of the first and second storage and dispensing stations having first and second medication dispensing channels, respectively, for dispensing individual medications, wherein each first medication dispensing channel is aligned with one of the first guide receptacle openings via one of a plurality of first slide openings disposed through the first holding unit such that individual medications dispensed from the plurality of first medication storage and dispensing stations are dispensed from the first guide dispensing opening, and wherein each second medication dispensing channel is aligned with one of the second guide receptacle openings via one of a plurality of second slide openings disposed through the second holding unit such that individual medications dispensed from the plurality of second medication storage and dispensing stations are dispensed from the second guide dispensing opening.

15. The medication dispensing device of claim 14, wherein each of the first and second holding units is one of pivotally mounted with a pivot joint and slidably mounted with a sliding mechanism.

16. The medication dispensing device of claim 14, wherein each of the first and second guide units are suspended from a girder of the frame structure.

17. The medication dispensing device of claim 14, further comprising a plurality of first medication slides removably fastened to the first holding unit, each first medication slide aligned with one of the plurality of first slide openings and at least partially received within one of the plurality of first guide receptacle openings.

18. A dispensing unit for a medication packaging device, comprising:

a first holding unit having first and second opposing sides;

a plurality of medication storage and dispensing stations removably fastened to the first side of the first holding unit, each storage and dispensing station having a medication dispensing channel for dispensing individual medications;

a plurality of medication slides removably fastened to the second side of the first holding unit;

a frame structure disposed on the second side of the first holding unit;

a second holding unit disposed on an opposing side of the frame structure from the first holding unit;

a guide unit removably fastened to the frame structure and disposed between the first and second holding units, the guide unit comprising a plurality of guide receptacle openings and a guide dispensing opening; and a mounting mechanism configured to provide movement of the frame structure and the first holding unit relative to one another.

19. The dispensing unit of claim 18, further comprising a plurality of medication slides removably fastened to the holding unit, wherein each medication slide is aligned with one of a plurality of slide openings disposed through the holding unit.

20. The dispensing unit of claim 19, wherein each medication slide is configured so that a formfitting connection exists between the medication slide and the holding unit, and wherein a portion of each medication slide is received within one of the plurality of guide receptacle openings.

* * * * *